Sept. 24, 1957    R. P. TARBOX    2,807,529
GASIFICATION OF CARBONACEOUS SOLIDS
Filed Jan. 21, 1954
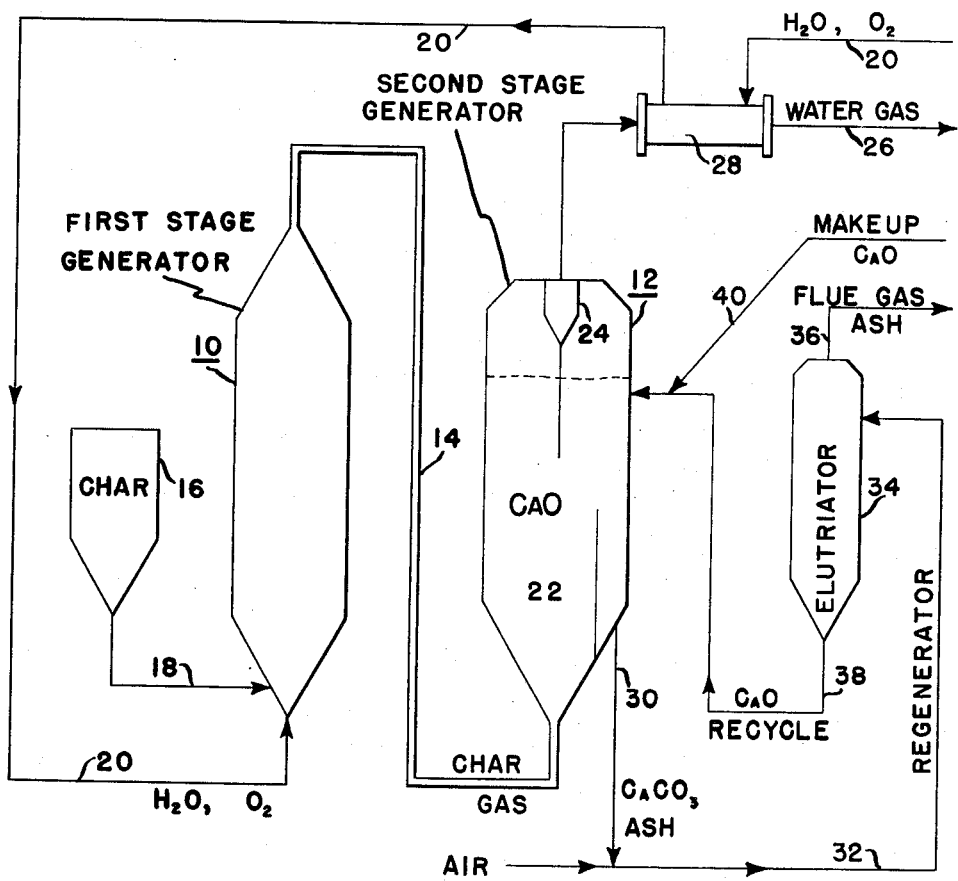
INVENTOR
RICHARD P. TARBOX
BY
D. Leigh Fowler, Jr.
ATTORNEY

United States Patent Office 2,807,529
Patented Sept. 24, 1957

2,807,529

GASIFICATION OF CARBONACEOUS SOLIDS

Richard P. Tarbox, Pittsburgh, Pa., assignor to Pittsburgh Consolidation Coal Company, Pittsburgh, Pa., a corporation of Pennsylvania Application January 21, 1954, Serial No. 405,319

5 Claims. (Cl. 48—206)

The present invention relates to the gasification of carbonaceous solids and, more particularly, to an improved process for making water gas by reacting carbonaceous solids with steam in the presence of calcium oxide as a carbon dioxide acceptor.

In the copending application of Everett Gorin, Serial Number 368,860 filed July 20, 1953 now U. S. Patent 2,705,672, and assigned to the assignee of the present invention, a process is described for making water gas by reacting steam with carbonaceous solids in a fluidized state. In this process, calcium oxide is present in the reaction zone for the purpose of absorbing the carbon dioxide produced and, by virtue of the exothermic character of the carbon dioxide-lime reaction, to supply a substantial part of the heat required by the endothermic steam-carbon reaction. As set forth in that application, it is critically necessary to maintain the partial pressure of the steam below 13 atmospheres throughout the steam-carbon reaction zone to prevent agglomeration of the calcium oxide to a non-operable condition. This limitation as to the steam partial pressure imposes an undesirable restriction on the total pressure of the reaction zone. Generally for temperatures between about 1500 and 1750° F., a pressure range of 15 to 50 atmospheres is preferred for the steam-carbon reaction.

In accordance with the present invention, I have provided an improved gasification process wherein steam is reacted with carbonaceous solids in two successive reaction zones at optimum temperatures and pressures in both zones, but with calcium oxide being employed as a $CO_2$ acceptor in only the second zone. In both zones substantially the same pressure is maintained, that is, between 15 and 50 atmospheres. The temperature in the first zone may be in the usual steam-carbon gasification range, i. e. 1400 to 2000° F., but in the second zone the temperature should lie between 1500 and 1750° F. A bed of carbonaceous solids is maintained in each zone. Steam is fed continuously to the first zone where its contact time with the solids is regulated so as to effect only partial conversion of the steam. The effluent gaseous product, including unreacted steam, from the first zone is conducted to the second zone where the reaction between the steam and carbonaceous solids is continued in the presence of sufficient calcium oxide to absorb substantially all the carbon dioxide produced. The average partial pressure of the steam in the second zone is maintained below 13 atmospheres in order to prevent agglomeration of the solids to an inoperable condition. This partial pressure limitation is achieved by appropriate regulation of the extent of steam conversion in the first zone. Water gas is recovered from the second zone.

For a better understanding of my invention, its further objects and advantages, reference should be had to the following description and to the accompanying drawing in which is shown a diagrammatic illustration of the preferred embodiment of the invention.

In the following description of the preferred embodiment of my invention, by way of example only, my improved process is applied to the conversion of char to water gas. The char is the solid low volatile distillation residue produced by the low temperature (i. e. 800–1200° F.) carbonization of high volatile bituminous coal from the Pittsburgh seam. It is to be understood, however, that my invention is generally applicable to any carbonaceous solids which react with steam to produce water gas.

The apparatus shown in the drawing and its operation will now be described. Numerals 10 and 12 designate reaction vessels adapted to serve as high pressure water gas generators. They are connected by a conduit 14 leading from the top of vessel 10 to the bottom of vessel 12. A bed of calcium oxide is provided in vessel 12. This bed is first brought to a temperature between 1500 and 1750° F. by any suitable means such as external heating of the vesssel or by burning producer gas or pulverized coal within the vessel itself. As soon as this temperature is attained, finely divided char is fed from a hopper 16 through a conduit 18 into vessel 10. At the same time steam and oxygen from a conduit 20 is introduced into the bottom of vessel 10. The amount of steam is in excess of that required to effect the desired carbon conversion in the two vessels 10 and 12 combined. The amount of oxygen is only that required to maintain by combustion of char a suitable steam-carbon reaction temperature, i. e. between 1400 and 2000° F. in vessel 10.

The steam and char flow in concurrent relationship through vessel 10 which is maintained under a pressure between 15 and 50 atmospheres. The residence time of the reactants in vessel 10 is regulated so that only partial conversion of the steam is effected, of the order of 25 to 50 percent. The limiting factor that determines the amount of conversion to be effected is the average partial pressure of the steam maintained in the second reaction zone in vessel 12. It must be less than 13 atmospheres. There is no advantage in carrying the conversion in vessel 10 beyond the point of ensuring the achievement of this partial pressure limitation in vessel 12 since it would only mean a greater oxygen consumption to maintain the desired temperature. If desired, the solids in vessel 10 may be maintained in a fluidized state by passing the steam and oxygen therethrough at suitable fluidizing velocities. In such a case, the partially converted solids and steam would be withdrawn separately from the vessel and transferred to vessel 12.

The effluent gases and partially converted char are transferred through conduit 14 into the bottom of vessel 12. The geometry of vessel 12 is such that the velocity of the gases passing therethrough is in the fluidizing range. The incoming char and gases mix with the lime in a dense fluid zone 22. The steam-carbon reaction continues in this zone until the desired steam conversion and carbon level is reached. The carbon level in the zone 22 is preferably less than 20% in contrast to a carbon level greater than 60% in vessel 10. The carbon dioxide produced in vessel 12 together with that entering the vessel from the first stage, is absorbed by the lime, evolving substantially all the heat required to maintain the temperature of zone 22 between 1500 and 1750° F.

The pressure within vessel 12 is maintained within the range of 15 to 50 atmospheres and is preferably the same as that maintained in vessel 10. In order for the lime in vessel 12 to function as a $CO_2$ absorber, the pressure must be above the dissociation pressure of calcium carbonate at the temperature of the reaction zone 22.

The amount of lime contained in zone 22 is sufficient to absorb substantially all the carbon dioxide produced as a result of the reaction between the steam and carbon in the two vessels 10 and 12. At least 250 parts by weight of calcium oxide are fed to vessel 12 for each 100 parts by weight of carbon contained in the char feed to vessel 10. The particle size of the lime and of the char and the velocity of the gases through zone 22 are selected so that the bed of solids in zone 22 is maintained as a fluidized bed comprising a dense phase having a well-defined level above which there is a dilute phase.

The reaction between the steam and carbon at a temperature between 1500 and 1750° F. under the pressures specified above produces a gas containing principally hydrogen, methane and carbon monoxide with a small amount of carbon dioxide. This gas is freed of solid particles by a cyclone separator 24 located within vessel 12 and is conducted by a conduit 26 to suitable use or storage facilities. Since the product gas is hot it is passed through a heat exchanger 28 in heat exchange relation with the stream of steam and oxygen passing through conduit 20 to vessel 10.

Substantially all the carbon dioxide produced is absorbed by the lime in vessel 12 with resulting generation of heat. The latter serves to supply most, if not all, the heat required for the steam-carbon reaction in vessel 12. The remaining heat that may be required can be supplied as sensible heat of hot lime fed from the regenerator described below.

The regeneration of calcium oxide from the calcium carbonate in the above system is accomplished in the following manner. The carbonate along with low carbon ash is continuously withdrawn from vessel 12 through a conduit 30, and discharges into a regeneration conduit 32 where it is picked up and carried along by a stream of air. Combustion of low carbon ash raises the temperature in the conduit to that required to regenerate the lime. The regenerated lime is fed to an elutriator 34 from which the fine particles of ash and flue gas are discharged through conduit 36. The heat contained in the hot ash and flue gas may be recovered by any suitable waste heat boiler (not shown). The hot regenerated lime drops through conduit 38 back into vessel 12. Fresh make-up lime may be added through conduit 40 as required to take care of losses from the system.

If desired, the passage of steam and carbonaceous solids through the two reaction zones may be countercurrent, instead of concurrent as described above. That is, the feed char may be introduced into the second vessel 12 while the feed steam is introduced into vessel 10. In such a case, it will be necessary to separate the calcium carbonate and any residual calcium oxide from the char withdrawn from vessel 12 before admitting the latter to vessel 10.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of producing water gas which comprises passing steam in reactive relationship with carbonaceous solids in two successive steam-carbon reaction zones, the second of which alone contains calcium oxide and which is maintained at a temperature within the range 1500 to 1750° F., both of said zones being maintained at a pressure within the range 15 to 50 atmospheres and the second zone being also maintained above the dissociation pressure of calcium carbonate at the operating temperature of said zone, effecting only partial conversion of the steam in the first zone, transferring the effluent gas and partially converted steam to the second zone, maintaining the average partial pressure of steam in said second zone below 13 atmospheres, continuing the reaction between the steam and carbonaceous solids in the second zone in the presence of sufficient calcium oxide to adsorb substantially all of the carbon dioxide produced, and recovering the gaseous products.

2. The method of producing water gas which comprises reacting carbonaceous solids with steam in two successive steam-carbon reaction zones, the second of which alone contains calcium oxide and which is maintained at a temperature within the range 1500 to 1750° F., both of said zones being maintained at a pressure within the range 15 to 50 atmospheres and the second zone being also maintained above the dissociation pressure of calcium carbonate at the operating temperature of said zone, effecting only partial conversion of carbon and steam in the first zone, transferring the partially converted carbon and steam to the second zone, maintaining the average partial pressure of steam in said second zone below 13 atmospheres, continuing the reaction between the carbon and steam in the second zone in the presence of sufficient calcium oxide to absorb substantially all of the carbon dioxide produced in both zones, and recovering the gaseous products.

3. The method of producing water gas which comprises reacting carbonaceous solids with steam in two successive steam-carbon reaction zones, the second of which alone contains calcium oxide and which is maintained at a temperature within the range 1500 to 1750° F., both of said zones being maintained at a pressure within the range 15 to 50 atmospheres and the second zone being also maintained above the dissociation pressure of calcium carbonate at the operating temperature of said zone, effecting only partial conversion of carbon and steam in the first zone, transferring the partially converted carbon and steam to the second zone, maintaining the solids in said second zone in a fluidized state, maintaining the average partial pressure of steam in said second zone below 13 atmospheres, continuing the reaction between the carbon and steam in the second zone in the presence of sufficient calcium oxide to absorb substantially all of the carbon dioxide produced in both zones, and recovering the gaseous products.

4. The method of producing water gas which comprises feeding carbonaceous solids and steam into a steam-carbon reaction zone maintained at a pressure between 15 and 50 atmospheres, retaining said steam and carbonaceous solids in said reaction zone for a sufficient time to effect only partial conversion of the steam and carbonaceous solids, transferring the effluent gas and the partially converted carbonaceous solids from said reaction zone to a second reaction zone containing calcium oxide, maintaining the solids in said second zone in a fluidized state under a pressure which is between 15 to 50 atmospheres and above the dissociation pressure of calcium carbonate at the operating temperature of said zone and at a temperature which is between 1500 and 1750° F., maintaining the average partial pressure of steam in said second zone below 13 atmospheres, the amount of calcium oxide in said second zone being sufficient to absorb substantially all of the carbon dioxide produced in both zones, withdrawing solids containing low carbon ash and calcium carbonate from said second zone, regenerating calcium oxide from said calcium carbonate by heat supplied by combustion of the low carbon ash, returning the regenerated calcium oxide to said second zone, and recovering the product gas from said second zone.

5. The method of producing water gas which comprises passing steam in reactive relationship into the first of two successive steam-carbon reaction zones, each maintained at a pressure in the range of 15 to 50 atmospheres and the second zone being also maintained above the dissociation pressure of calcium carbonate at the operating temperature of said zone, introducing carbonaceous solids and calcium oxide into the second of said reaction zones which is maintained at a temperature of 1500 to 1750° F., withdrawing from said second reaction zone solids containing calcium carbonate and partially exhausted carbonaceous solids, separately recovering said calcium carbonate, regenerating said calcium carbonate to calcium oxide and returning said calcium oxide to said second reaction zone, maintaining sufficient calcium oxide in said second reaction zone to absorb substantially all the carbon dioxide produced in both reaction zones, passing said partially exhausted carbonaceous solids into said first reaction zone, recovering from said first reaction zone and passing into said second reaction zone a gaseous product having a partial pressure of steam of less than 13 atmospheres, and recovering a product gas from said second reaction zone.

References Cited in the file of this patent

UNITED STATES PATENTS

| | | |
|---|---|---|
| 2,662,007 | Dickinson | Dec. 8, 1953 |
| 2,705,672 | Gorin | Apr. 5, 1955 |